United States Patent [19]
Gardiner

[11] Patent Number: 6,126,361
[45] Date of Patent: Oct. 3, 2000

[54] APPARATUS AND METHOD FOR INSTALLATION OF A FLUID DISPENSER IN WASTEWATER

[76] Inventor: Jack C. Gardiner, 5207 Fountainbridge La., Houston, Tex. 77069

[21] Appl. No.: 08/971,589

[22] Filed: Nov. 17, 1997

[51] Int. Cl.[7] .................................................. B01F 3/04
[52] U.S. Cl. ......................... 405/53; 405/52; 210/198.1; 210/219; 210/232
[58] Field of Search .............................. 405/52, 53, 128; 210/198.1, 219, 232, 754

[56] References Cited

U.S. PATENT DOCUMENTS

| | | | |
|---|---|---|---|
| 4,464,259 | 8/1984 | Cramer et al. | 210/219 |
| 4,663,055 | 5/1987 | Ling et al. | 210/198.1 |
| 4,671,872 | 6/1987 | Cramer et al. | 210/219 |
| 4,774,031 | 9/1988 | Schurz | 210/219 |
| 4,966,690 | 10/1990 | Gardiner et al. | 210/219 |

*Primary Examiner*—Eileen Dunn Lillis
*Assistant Examiner*—Frederick L. Lagman
*Attorney, Agent, or Firm*—Browning Bushman

[57] ABSTRACT

An apparatus and method for installing a fluid dispenser (10) in a submerged relation in wastewater of a wastewater chamber (14). The fluid dispenser (10) is secured to a bracket (44) which slides along a vertical post (32) in the wastewater to a desired depth at which a stop (46) positions and blocks further sliding movement of the bracket (44) and fluid dispenser (10). Fluid dispenser (10) and sliding bracket (44) move downwardly from the upper end of post (32) and when sliding bracket (44) hits the stop (46), bracket (44) and dispenser (10) pivot relative to the post (32) to a desired position and direction of the dispenser (10). Serrated knife edges (100) on propeller (92) cooperate with serrated knife edges (112) on collar (90) on opposed sides of an orifice (106) to cut and remove any solid particles obstructing the orifice (106). Orifice (106) is adjusted by rotation of a threaded collar (90) on threaded vacuum tube (82) and secured by set screw (114) to obtain a uniform orifice size about the entire periphery of the orifice (106).

11 Claims, 4 Drawing Sheets

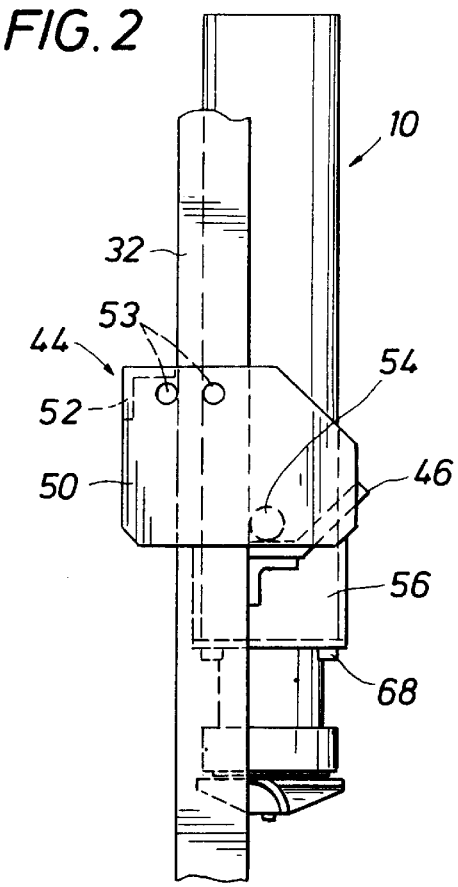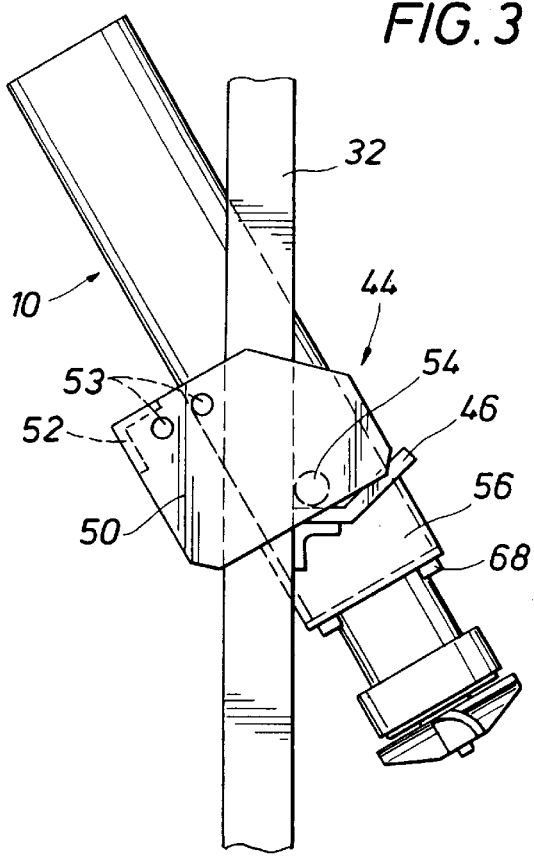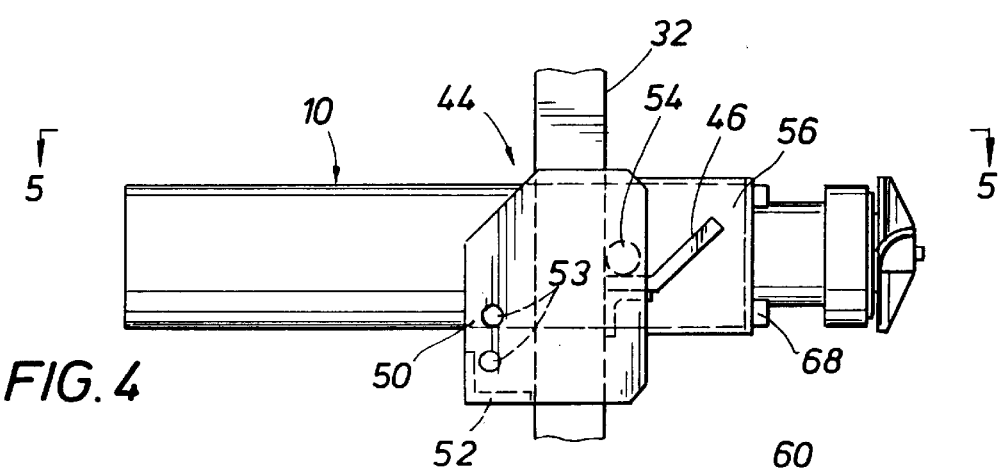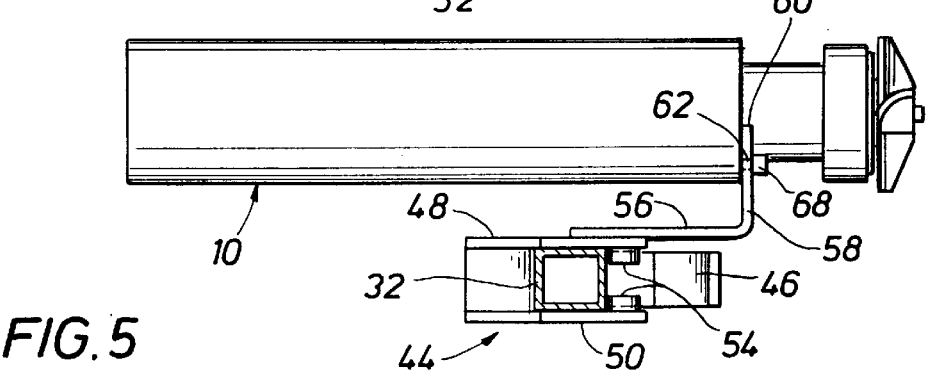

APPARATUS AND METHOD FOR INSTALLATION OF A FLUID DISPENSER IN WASTEWATER

FIELD OF THE INVENTION

This invention relates generally to wastewater treating systems and particularly an apparatus and method for installing a fluid dispenser for a treating agent in submerged relation within a wastewater chamber or unit.

BACKGROUND OF THE INVENTION

Heretofore, as shown in U.S. Pat. No. 4,966,690 dated Oct. 30, 1990, a gas dispenser for wastewater, such as an apparatus for dispensing chlorine gas in wastewater, has been utilized. The gas dispenser includes a gas supply line to the dispenser to supply the gas thereto with the gas dispenser being submerged in the wastewater chamber or facility. A propeller on the lower end of a drive shaft for the dispenser is effective for creating a low pressure for pulling chlorine gas within a vacuum tube for mixing and dispersal into the wastewater. It is desirable that the gas dispenser or chlorinator be lightweight and relatively small to facilitate handling and installation. The gas dispensers are oftentimes removed from a submerged location within the wastewater chamber for maintenance or repair, or may be relocated to a different location.

A gas dispenser for the treating agent is normally positioned at a precise submerged position within a treatment chamber, particularly at a precise depth in the wastewater and extending in a precise direction. It is important also, that debris or solid particles in the wastewater not obstruct or restrict the flow of gas or chlorine into the wastewater from the dispenser.

SUMMARY OF THE INVENTION

The present invention is directed primarily to an apparatus and method for installing a fluid dispenser for a treating agent in submerged relation within wastewater in a wastewater chamber without any workmen immersed in the wastewater. The fluid dispenser which includes a motor and propeller is positioned at a precise submerged location and depth in the wastewater and may be easily removed for maintenance or repair. The fluid dispenser is effective for dispensing either a gas or a liquid treating agent.

The apparatus includes a vertical post having a bottom support plate which is supported on the bottom or floor of the tank and extends above the upper level of wastewater. A horizontal post support bracket including a horizontal support web is secured to a vertical side wall of the wastewater chamber and extends between the vertical post and the vertical wall to support the post in the wastewater chamber. The fluid dispenser is secured to a sliding pump support bracket which slides along the vertical post from the upper end thereof to a stop secured to the post at a submerged position within the wastewater at which it is desired to position the fluid or chlorine dispenser for dispensing the chlorine within the wastewater. The fluid dispenser has an elongate cylindrical housing and is mounted on the sliding support bracket for movement in a generally vertical axial direction when sliding along the post. When the sliding support bracket engages the stop, the fluid dispenser and bracket pivot by gravity to a predetermined position for the fluid dispenser for dispersing the treating agent into the wastewater. The center of gravity of the sliding bracket and fluid dispenser is offset from the pivotal axis of the sliding bracket on the stop for pivoting of the fluid dispenser and sliding bracket by gravity upon contact with the stop on the post. A detent on the bracket engages the post upon pivotal movement of the bracket and fluid dispenser to a desired angular position.

The sliding support bracket and fluid dispenser may be easily removed from the wastewater by lifting of the slidable bracket and fluid dispenser relative to the post by a suitable lift line or cable extending to a location above the wastewater surface. Thus, the fluid dispenser of this present invention may be easily installed at a precise submerged location within a wastewater tank and easily removed from the submerged location by an operator or workman positioned above the wastewater in the wastewater chamber without any immersion of the operator or workman.

While wastewater and a wastewater chamber have been defined herein, it is understood that the invention is applicable for water and an associated water chamber. The term "wastewater" as used in the specification and claims herein is interpreted as including "water."

Other features and advantages of the invention will be apparent from the following specification and drawings.

BRIEF DESCRIPTION OF THE DRAWINGS

FIG. 2 is an enlarged portion of FIG. 1 showing a fluid dispenser mounted on the sliding bracket for sliding downwardly along the support post with the support bracket initially engaging a stop on the post prior to pivoting of the sliding bracket and dispenser;

FIG. 3 is a view similar to FIG. 2 but showing the sliding bracket and fluid dispenser pivoting from the position of FIG. 2;

FIG. 4 is a view similar to FIGS. 2 and 3 but showing the sliding bracket and fluid dispenser pivoted to a final installed position with a detent on the bracket contacting the post to stop the pivotal movement;

FIG. 5 is an elevation taken generally along line 5—5 of FIG. 4;

BRIEF DESCRIPTION OF THE INVENTION

Figure 1:
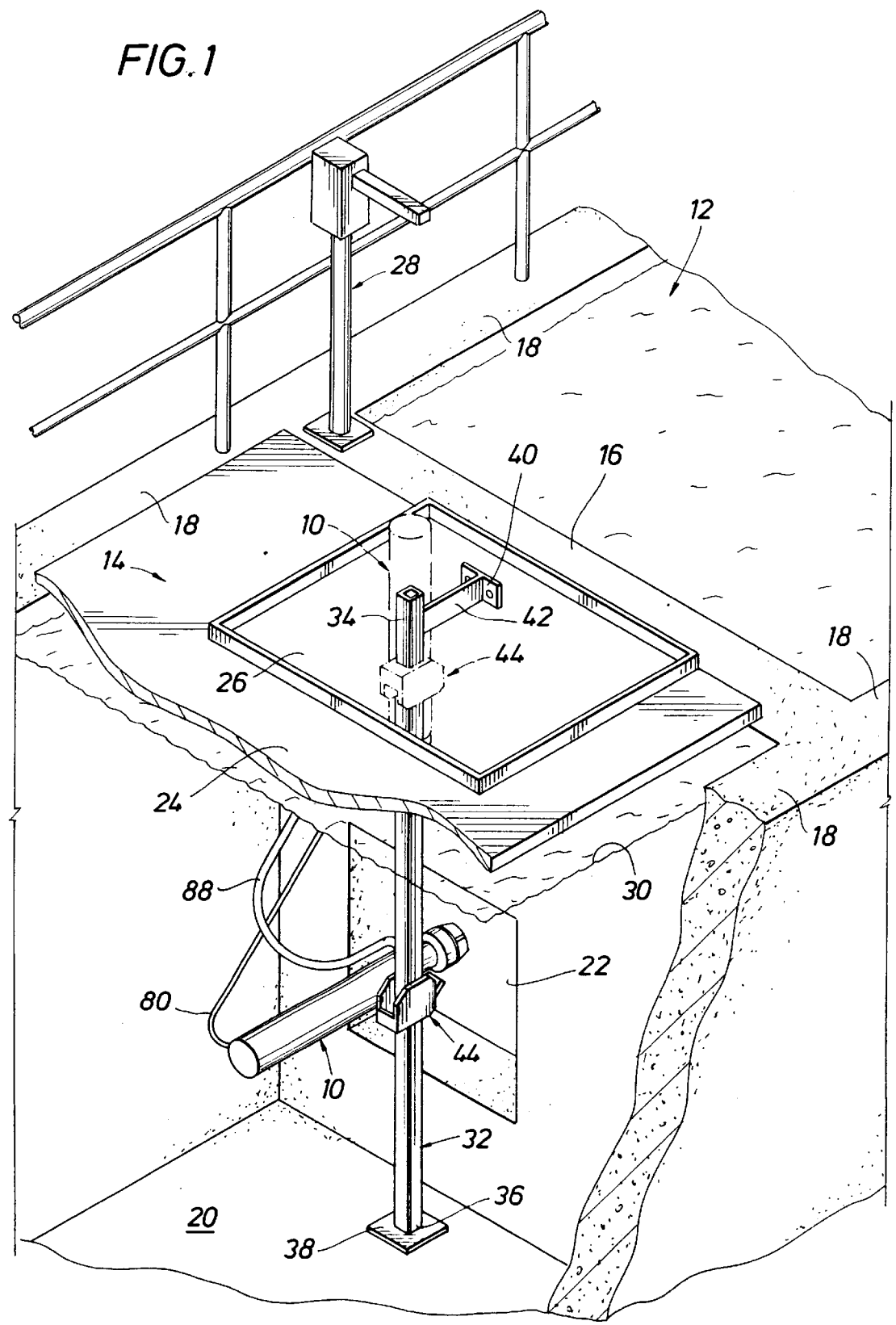
FIG. 1 is a perspective of a wastewater treating facility including a pair of adjacent wastewater chambers with the fluid dispenser of the present invention mounted in a submerged relation within the wastewater for dispensing a treating agent therein, the fluid dispenser being shown in an installed operable position in solid lines and shown in an initial position in broken lines for sliding movement along a vertical support post into the installed position.

Referring now to the drawings for a better understanding of this invention, and more particularly to FIG. 1, a typical wastewater treatment facility is shown which utilizes a fluid or chlorine dispenser generally indicated at 10 and installed in accordance with the present invention. The wastewater facility includes a pair of adjacent wastewater chambers or compartments 12 and 14 separated by a connecting wall 16. Wastewater chambers 12 and 14 include side walls 18 and a bottom wall 20. A horizontal opening is shown at 22 in connecting wall 16 to permit the flow of wastewater between wastewater chambers 12 and 14. A top wall or cover 24 is shown over wastewater compartment 14 and has an opening 26 therein. A crane generally indicated at 28 is positioned on connecting wall 16 over opening 26 to assist in the installation of fluid dispenser 10 and the supporting structure for fluid dispenser 10. The wastewater level is shown at 30 with fluid dispenser 10 shown in a submerged operable position in solid lines in FIG. 1.

Apparatus comprising the present invention is shown for installation of fluid dispenser 10 in wastewater chamber 14 is illustrated. Fluid dispenser 10 is shown in a submerged installed position within the wastewater of chamber 14 positioned adjacent opening 22 between chambers 12 and 14 for dispensing chlorine in the wastewater flowing between chambers 12 and 14 through opening 22. For installation of dispenser 10, a vertically extending post, generally indicated at 32 has telescoping sections 34 and 36. Lower telescoping section 36 has a lower support plate 38 thereon supported on bottom wall 20. A post support bracket 40 is secured to connecting wall 16 and has a horizontal web 42 secured to post 32 for mounting post 32 at a predetermined location within the wastewater. Post 32 may be installed in wastewater chamber 14 by crane 28 without requiring a workman to be immersed within the wastewater. Post 32 may be lowered by crane 28 into supporting relation with lower support plate 38 on bottom wall 20. After installation of post 32, dispenser 10 may then be installed.

Dispenser 10 as shown in FIGS. 2–5 is mounted on a sliding bracket generally indicated at 44 for movement therewith. Post 32 has a stop 46 comprising an angled tab or plate member extending outwardly from post 32 to stop and block the downward sliding movement of bracket 44 and dispenser 10 along post 32. Sliding bracket 44 has a pair of side plates 48 and 50 connected by a transverse angle 52 which forms a detent for limiting the pivotal movement of bracket 44 as shown particularly in FIG. 4 in which angle 42 contacts post 32 for positioning dispenser 10 in a desired angular relation. For positioning dispenser 10 at different angular relations to post 32, a plurality of openings 53 in side plates 48, 50 are provided. A suitable bolt may be inserted within a desired opening 53 in side plates 48, 50 to contact post 32 and position dispenser 10 at a different predetermined angular relation to post 32. Each side plate 48, 50 has an inwardly extending cylindrical retaining guide 54 which forms a pivot for bracket 44 on stop 46. A space 55 is provided between opposed guides 54 to receive web 42 of bracket 40 when bracket 44 slides past web 42. A lower support angle generally indicated at 56 is secured to side plate 48 and has a lower leg 58. Lower leg 58 has an arcuate indentation or cutout at 60 and a pair of openings 62 therein adjacent arcuate indentation 60.

Figure 6:
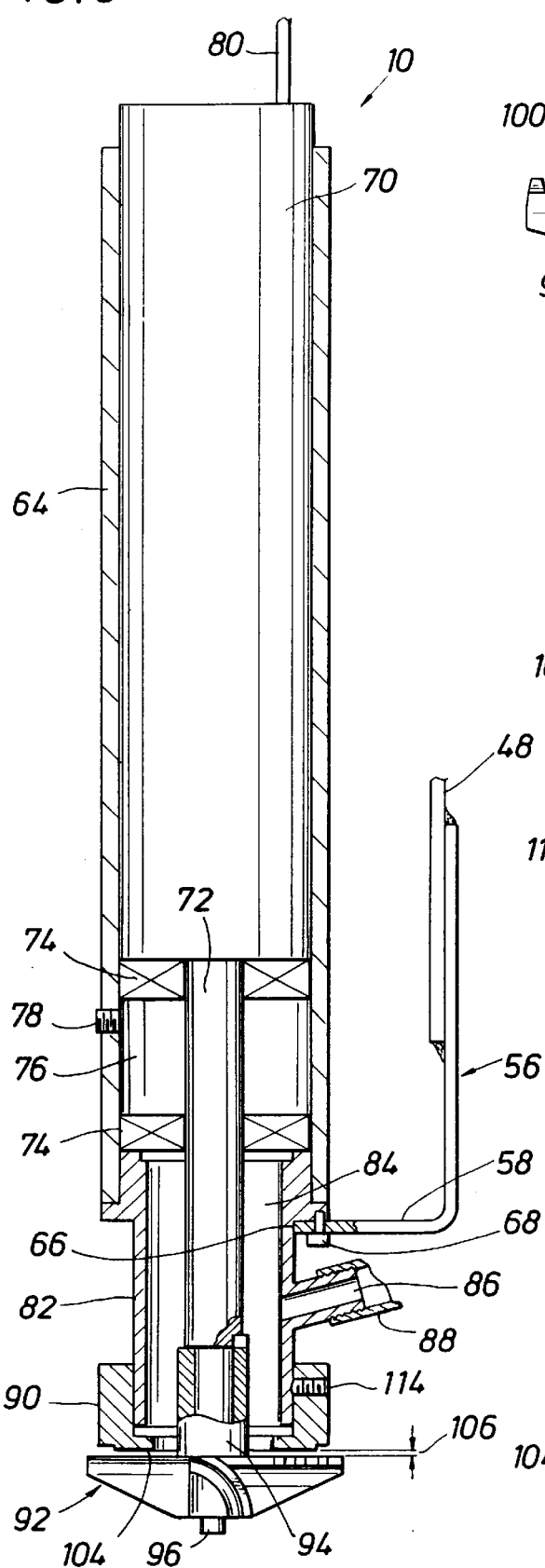
FIG. 6 is an enlarged sectional view of the fluid dispenser showing the drive shaft with the propeller on the lower end thereof spaced from the lower end of the vacuum tube which draws fluid for dispensing upon rotation of the propeller.

Dispenser 10 as shown particularly in FIG. 6 has a generally cylindrical housing or body 64 therein having a lower base 66 mounted on leg 58 of support 56 by suitable bolts 68. An electric motor generally indicated at 70 is mounted within housing 64 and has a drive shaft 72 mounted for rotation about bearings 74. An oil chamber is provided at 76 between bearings 74 and an oil plug 78 is provided for oil chamber 76 which has a non-hydrocarbon lubricating oil therein. A non-hydrocarbon lubricating oil is provided so that it will not react in the event it comes into contact with the treating agent, such as chlorine gas. Motor 70 is connected to a source of electrical energy through electrical supply line 80 and preferably comprises a two (2) horsepower electric motor of around 3500 rpm. A vacuum tube 82 is secured to the lower end of housing 64 and has an annular chamber 84 for the treating liquid or gas, such as chlorine, which is transmitted through a port 86 connected to a suitable line 88 extending to a gas supply. Tube 82 is received within arcuate cutout 66 of leg 58.

A collar 90 is secured to vacuum tube 82 and a propeller 92 has a hub 94 receiving shaft 72. A propeller 92 is secured to shaft 72 by a suitable bolt 96. Propeller 92 has a plurality of blades 98 extending outwardly from hub 94 and having leading sharp serrated cutting edges 100. Collar 90 has a lower projecting face 104 spaced a distance or clearance 106 from cutting edges 100. Projecting face 104 has a plurality of radial slots 106 defining a sloping surface 110 and a sharp cutting edge 112. Cutting edge 112 is serrated to provide sharp teeth. The orifice or clearance 106 between collar 90 and propeller 92 is preferably about 0.010 inch. A clearance 106 between about 0.005 inch and about 0.020 inch has been found to function effectively. As propeller 92 is driven by rotation of shaft 72 by motor 70, a region of low pressure is formed at clearance 106 and within annular chamber 84 of vacuum tube 82 by the rotative action of propeller 92 and the rush of wastewater at high velocity past clearance 106. Such a vacuum causes a supply of chlorine fluid to be sucked in through port 86 and chamber 84, and discharged through annular orifice or clearance 106 into the wastewater for dispersal in a highly effective manner. Collar 90 is internally threaded for adjustment on externally threaded vacuum tube 82 for adjusting the size of orifice 106. A set screw 114 is effective for securing collar 90 on threaded vacuum tube 82 for adjustment of orifice 106.

Figure 7:
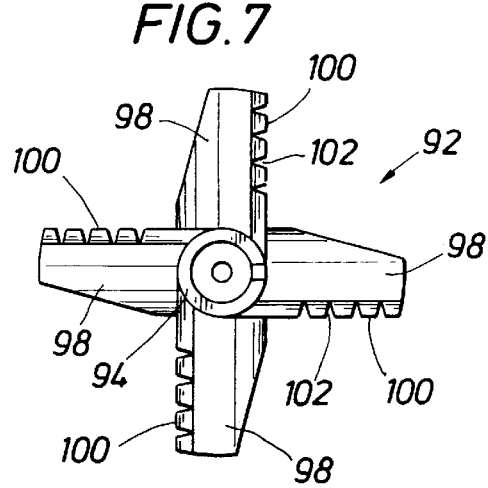
FIG. 7 is an enlarged plan of the blades on the propeller and showing serrated edges effective for slicing and removal of any solid particles in the wastewater adjacent the propeller.
Figure 8:
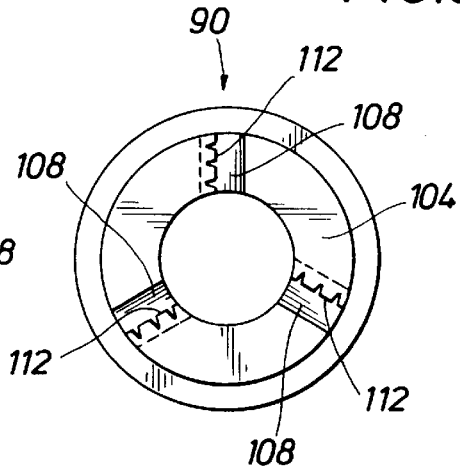
FIG. 8 is a bottom plan of the collar showing a plurality of radial slots having serrated cutting edges.
Figure 9:
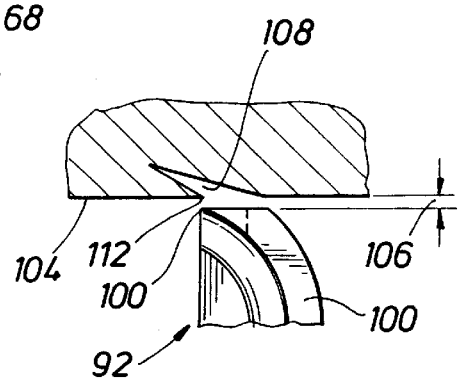
FIG. 9 is an enlarged fragment showing the clearance between the collar and propeller with opposed cutting edges thereon for cutting solid particles.
Figure 10:
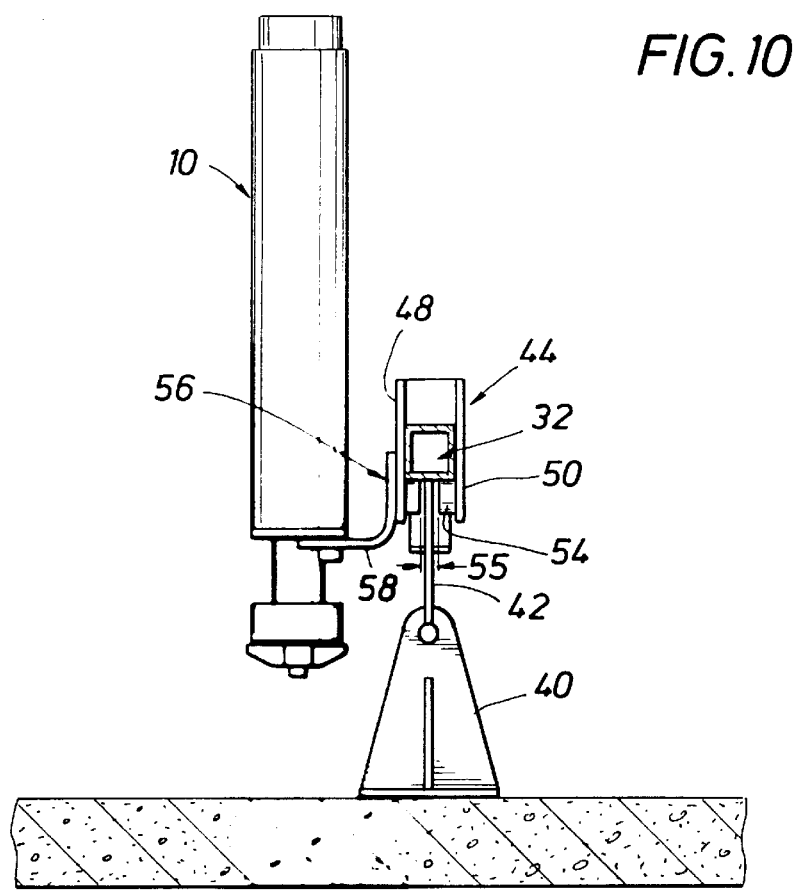
FIG. 10 is a top plan showing the dispenser mounted on a post with the support bracket providing clearance for the web.

It is important that any solid particles, such as stringy material, not obstruct orifice 106 to affect the fluid being dispersed therefrom. The serrated blades 100 on propeller 92 and the opposed sharp serrated edges 112 on adjacent face 104 of collar 90 are effective to slice or chop any solid particles in clearance 106 between propeller 92 and face 104 as shown particularly in FIGS. 7–9. Propeller 92 rotates at speeds as high as 3500 rpm and is highly effective in the removal of any solid particles which tend to move into or infiltrate orifice 106. The sharp serrated cutting edges 100 and 112 are hardened to a hardness of Rockwell 70C for minimizing the wear of such sharp edges.

From the foregoing, it is apparent that an improved mounting for fluid dispenser 10 has been provided for mounting dispenser 10 at a precise submerged location in wastewater in a wastewater chamber. Dispenser 10 can be positioned at a desired depth and direction with respect to the flow of wastewater and workman are not required to become immersed in the wastewater in order to initially position the dispenser 10 or to remove the dispenser 10 from submerged position for repair or maintenance. Also, cooperating serrated knife edges on the propeller and the adjacent face of the collar are effective to restrict any solid particles from entering the orifice 106 defined between the cooperating sharp serrated knife edges which tend to slice or chop any solid particles received therebetween. The orifice 106 is precisely adjusted by having collar 90 threaded onto vacuum tube 82 and secured therein by set screw 114 to provide a uniform clearance about the entire periphery of orifice 106.

Figure 11:
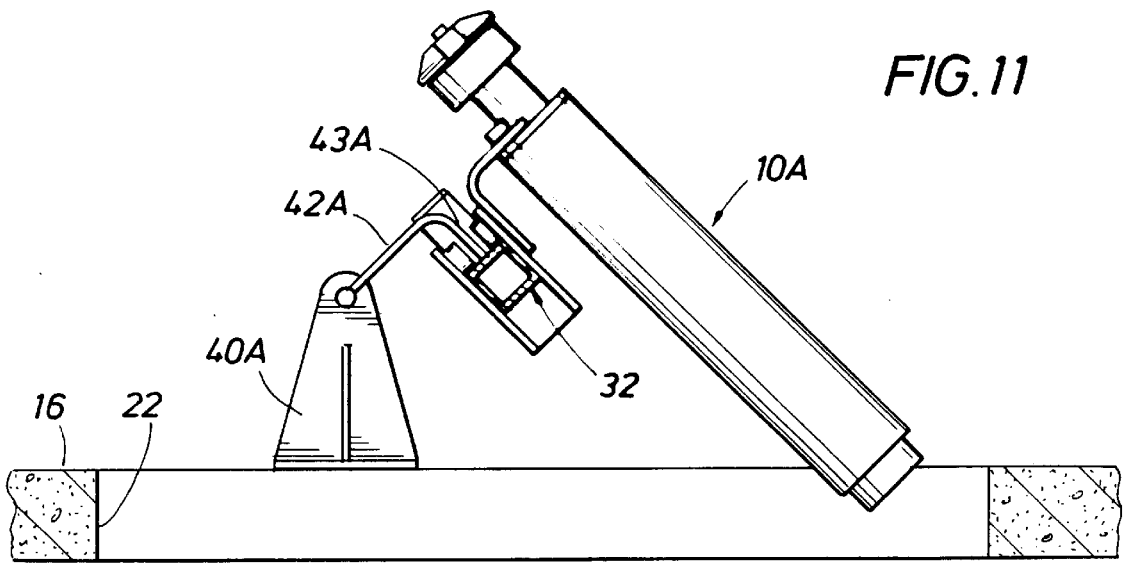
FIG. 11 is a plan of a modified mounting for the fluid dispenser showing an angled web member for supporting the post on which the fluid dispenser is mounted.

Referring to a modified support for dispenser 10 as shown in FIG. 11, dispenser 10A is mounted on post 32A as in the embodiment of FIGS. 1–10. Fluid dispenser 10A is positioned with its longitudinal axis arranged at a 45 degree angle with respect to opening 22 in connecting wall 16. Bracket 40A has an angle-shaped web 42A forming a leg 43A secured to post 32A thereby to position dispenser 10A in a desired direction. If desired, web 42A could be arranged at different angular relationships with respect to bracket 40A for positioning dispenser 10A in a predetermined direction.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A method for installing a fluid dispenser in a submerged relation in wastewater within a wastewater chamber for dispersing a fluid treating agent within the wastewater; said method comprising the following steps:

mounting a generally vertical support post within the wastewater chamber;

mounting a fluid dispenser of an elongate shape on a sliding bracket for sliding movement of the fluid dispenser and bracket along said post with the longitudinal axis of said fluid dispenser being in a generally vertical direction;

mounting said bracket and fluid dispenser on the upper end of the post above the level of wastewater in the wastewater chamber with the post being received by the bracket in telescoping sliding relation;

lowering said bracket and fluid dispenser in sliding relation downward along said post to a stop on said post at a desired location of the fluid dispenser for blocking further downward sliding movement of said bracket and fluid dispenser; and pivoting said bracket and fluid dispenser about a horizontal axis into a desired angular relation relative to said post when said bracket engages said stop for dispensing the treating agent within the wastewater.

2. A method for installing a fluid dispenser as set forth in claim 1 further including the steps of:

mounting a post support bracket on a vertical wall defining the wastewater chamber at a height above the wastewater and including a web extending from the post support bracket to the post for mounting the post in said wastewater chamber; and constructing said sliding bracket for sliding down said post from the upper end thereof to receive said web for sliding downwardly past said web to said stop.

3. A method of installing a fluid dispenser as set forth in claim 1 including the step of:

sliding said sliding bracket and said fluid dispenser upwardly along said post from said installed position for removal of said sliding bracket and said fluid dispenser from the upper end of said post.

4. A method of installing a fluid dispenser as set forth in claim 1 including the steps of:

providing an opening in an upper wall over the wastewater chamber for receiving said post and fluid dispenser for installation of said fluid dispenser; and mounting a crane over said opening to assist in the lowering of said post within the wastewater chamber for installation of said post.

5. Apparatus for installing a fluid dispenser within wastewater of a wastewater compartment in submerged relation, the fluid dispenser having an electrical motor, a shaft driven by said motor, a propeller on the end of said shaft, a vacuum tube about said shaft, a collar about said vacuum tube adjacent said propeller, an orifice between said collar and propeller for dispersal of a treating fluid therefrom upon rotation of said propeller, and sharp opposed cutting edges on said propeller and said collar on opposed sides of said orifice for cutting solid particles entering said orifice; said apparatus comprising:

a generally vertically extending post mounted within said wastewater compartment for extending above the level of wastewater in said compartment;

a sliding support bracket mounted on said post for sliding movement and having said fluid dispenser mounted thereon for sliding movement with said support bracket;

a stop on said post to block the downward sliding movement of said sliding support and fluid dispenser; and pivot means on said sliding support to effect pivoting of said sliding bracket and fluid dispenser to a desired direction of said fluid dispenser upon contact of said support bracket with said stop.

6. Apparatus for installing a fluid dispenser as set forth in claim 5 wherein:

a post support bracket is secured to said wastewater compartment and the transverse web secured to said post; and said sliding support has a slot to receive said web to permit said sliding support to pass said web.

7. Apparatus for installing a fluid dispenser as set forth in claim 5 wherein:

said sliding bracket including a pair of spaced side plates and a support angle is mounted on one of said side plates for supporting the fluid dispenser thereon.

8. Apparatus for installing a fluid dispenser as set forth in claim 7 wherein:

a pivot stop is mounted on said sliding bracket to contact said post and limit the pivotal movement of said sliding bracket and fluid dispenser on said stop.

9. A fluid dispenser for dispensing a treating agent within wastewater in a wastewater compartment; said fluid dispenser comprising:

a body having a generally cylindrical housing;

an electric motor within said housing;

a shaft driven by said motor;

a propeller on the end of said shaft;

a vacuum tube about said shaft;

a collar about said vacuum tube adjacent said propeller;

an orifice between said collar and propeller for dispersal of a treating agent therefrom upon rotation of said propeller; and sharp opposed cutting edges on said propeller and said collar on opposed sides of said orifice for cutting solid particles entering said orifice, at least one of said cutting edges being serrated for cutting of said solid particles.

10. A fluid dispenser as set forth in claim 9 wherein said vacuum tube is externally threaded and said collar has an internally threaded central opening threaded onto said vacuum tube for positioning of said collar at a desired position for providing a predetermined orifice size; and a set screw is provided to secure said collar to said guide tube at the desired position.

11. A method for installing a fluid dispenser in a submerged relation in wastewater within a wastewater chamber for dispersing a fluid treating agent within the wastewater; said method comprising the following steps:

mounting a generally vertical support post within the wastewater chamber;

mounting a fluid dispenser on a sliding bracket for sliding movement of the fluid dispenser and bracket along said post;

constructing said sliding bracket of a pair of spaced parallel side plates and mounting a support angle on one of the side plates for the fluid dispenser;

mounting the fluid dispenser on the support angle for movement with the sliding bracket;

mounting said sliding bracket and fluid dispenser on the upper end of the post above the level of wastewater in the wastewater chamber with the post being received by the bracket in telescoping sliding relation;

lowering said sliding bracket and fluid dispenser in sliding relation downward along said post to a stop on said post at a desired location of the fluid dispenser for blocking further downward sliding movement of said bracket and fluid dispenser; and pivoting said sliding bracket and fluid dispenser when said bracket engages said stop into a desired direction of said fluid dispenser for dispensing the treating agent within the wastewater.

* * * * *